United States Patent
Wong et al.

(10) Patent No.: US 6,260,006 B1
(45) Date of Patent: Jul. 10, 2001

(54) SYSTEM AND METHOD FOR MULTI-VOLUME TAPE LIBRARY

(75) Inventors: Patrick K. Wong, Louisville; Timothy L. Puckett, Thornton; Keith F. Noe, Westminster, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/218,256

(22) Filed: Dec. 22, 1998

(51) Int. Cl.[7] .............................. G06F 9/455; G06F 12/08
(52) U.S. Cl. .................................. 703/27; 703/24; 711/4; 711/111
(58) Field of Search .......................... 710/1, 40; 711/114, 711/111, 2, 112, 207, 4; 360/77.16, 78.02; 369/34, 30; 395/82.1; 707/204

(56) References Cited

U.S. PATENT DOCUMENTS

| | | | |
|---|---|---|---|
| 4,481,573 | * 11/1984 | Fukunaga et al. | 711/207 |
| 4,876,662 | 10/1989 | Pence . | |
| 5,121,483 | * 6/1992 | Monahan et al. | 710/40 |
| 5,127,094 | * 6/1992 | Bono | 711/2 |
| 5,355,259 | 10/1994 | Shih . | |
| 5,446,602 | 8/1995 | Adams et al. . | |
| 5,502,811 | 3/1996 | Ripberger . | |
| 5,504,873 | * 4/1996 | Martin et al. | 711/111 |
| 5,546,557 | 8/1996 | Allen et al. . | |
| 5,602,686 | 2/1997 | Shih . | |
| 5,613,154 | * 3/1997 | Burke et al. | 710/1 |
| 5,805,864 | 9/1998 | Carlson et al. . | |
| 5,809,511 | 9/1998 | Peake . | |
| 5,883,864 | * 3/1999 | Saliba | 369/30 |
| 5,963,971 | * 10/1999 | Fosler et al. | 711/114 |
| 6,023,709 | * 2/2000 | Anglin et al. | 707/204 |
| 6,070,224 | * 5/2000 | LeCrone et al. | 711/112 |

* cited by examiner

Primary Examiner—Kevin J. Teska
Assistant Examiner—Russell W. Frejd
(74) Attorney, Agent, or Firm—Brooks & Kushman P.C.

(57) ABSTRACT

A tape library system for handling multi-volume tapes includes an automated tape system with at least one tape unit and a robotic tape handling system. The tape library system receives requests from at least one host for access to a specified tape volume in a specified tape unit. The tape library system includes a tape/library control unit that receives the request from the host computer and maps the specified tape volume to a tape cartridge. The TLCU determines if the tape cartridge is currently loaded in a tape unit and, if the tape cartridge is not loaded, commands the robotic tape handling system to load the cartridge into an available unit. The TLCU forms a virtual path between the host computer and the loaded tape unit. Data is then transferred between the loaded tape unit and the host computer. Thus, the host computer is presented with a virtual view of connection to the specified tape volume loaded in the specified tape unit.

21 Claims, 6 Drawing Sheets

UNIT/CARTRIDGE/VOLUME TABLE — 86

| TAPE UNIT IDENTIFIER | CARTRIDGE TYPE | VOLSER |
|---|---|---|
| ... | ... | ... |

UNIT AVAILABILITY TABLE — 80

| TAPE UNIT IDENTIFIER | CARTRIDGE TYPE | TAPE UNIT ADDRESS | IN-USE INDICATOR | FREQUENCY OF USE | PROBLEM INDICATOR | LAST TIME USED |
|---|---|---|---|---|---|---|
| ... | ... | ... | ... | ... | ... | ... |

VOLUME INFORMATION TABLE — 82

| VOLSER | CARTRIDGE IDENTIFIER | FREQUENCY OF USE | PASSWORD | OWNER | GROUP | EXPIRATION DATE | ACCESS PERMISSIONS |
|---|---|---|---|---|---|---|---|
| ... | ... | ... | ... | ... | ... | ... | ... |

CARTRIDGE INFORMATION TABLE — 84

| CARTRIDGE IDENTIFIER | CARTRIDGE TYPE | CARTRIDGE LOCATION | IN-USE INDICATOR | FRAGMENT INDICATOR | USED SPACE | FREE SPACE | DEFECT SPACE |
|---|---|---|---|---|---|---|---|
| ... | ... | ... | ... | ... | ... | ... | ... |

*Fig. 4*

SYSTEM AND METHOD FOR MULTI-VOLUME TAPE LIBRARY

TECHNICAL FIELD

The present invention relates to servicing requests received by a magnetic tape library and library management resulting therefrom.

BACKGROUND ART

Digital magnetic tape is commonly used for long term storage in computer systems. The low cost per bit stored, long term retention capability, and portability of magnetic tape cartridges has made magnetic tape the medium of choice for storing the large quantities of data produced by businesses such as banks, credit card companies, airlines, and the like. Automated tape libraries are often used to rapidly handle the number of tape cassettes required to hold large amounts of data. Such automated tape libraries typically include multiple tape units for accessing data on magnetic tapes and a robotic tape handling system for transferring tape cartridges between a tape unit and a cartridge storage location.

The large amounts of data to be stored are typically broken into volumes by host computers that process the data. A single tape cartridge is then used to hold the data volume. This may lead to waste as the magnetic tape stored in the cartridge may be capable of holding significantly more data than is contained in the volume. Also, tape management is typically controlled by a host computer. The host computer tracks location of cartridges, the volume on each cartridge, and the cartridge or cartridges being accessed by each tape unit.

One difficulty with current tape management systems is the overhead required of the host computer to manage the tape library. Another difficulty is that the tape management system within the host computer must be modified each time changes are made to the tape library. Yet another problem of current tape management systems implemented in host computers is the inability to manage tape cassettes containing multiple volumes.

A further difficulty with previous tape management systems becomes apparent when data must be manually put into or taken out of the computer system. For example, consider bringing data into the computer system from a separate computer system. If the tape cartridge is compatible with tape units in the automated tape library, the new tape must be manually introduced into the robotic tape handling system. The host computer must then be instructed to assign the new tape a volume identifier and process the tape into the tape library. If the new tape has a format incompatible with any tape unit in the automated tape system, a new tape unit must be connected to an open channel from the host computer. The host computer must then be directed to copy the information from the new tape cartridge onto a blank tape within the automated tape handling system. This may require writing specialized code for the host computer to access the new tape unit, read in the data, reformat the data for a cartridge type contained within the automated library system, and store the data on a blank tape cartridge.

What is needed is a tape library system that removes tape management functions from the host computer. This tape library system should handle multi-volume tapes to increase storage efficiency. The host computer should be presented with a virtual view of tape volumes and tape units so that extensive reprogramming of the host computer is not required. The tape management system should also allow for convenient copying of data to and from tape cartridges external to the automated tape library.

DISCLOSURE OF INVENTION

It is an object of the present invention to provide a means for reducing tape management overhead required by a host computer.

Another object of the present invention is to provide support for handling multi-volume tape cartridges.

Still another object of the present invention is to provide a host computer with a virtual view of connection to a specified tape volume loaded in a specified tape unit.

Yet another object of the present invention is to provide convenient manual copying of data into and out of an automated tape library.

In carrying out the above objects and other objects and features of the present invention, a tape library system for handling multi-volume tapes is provided. The system includes an automated tape system with tape units for writing data to and reading data from magnetic tapes. The automated tape system also includes a robotic tape handling system for loading tape cartridges into and removing tape cartridges from the tape units. A tape/library control unit (TLCU) receives a request from a host computer to access a specified tape volume in a tape unit specified by the host computer. The TLCU maps the specified tape volume to a tape cartridge. A check is made to determine if the tape cartridge is currently loaded in a tape unit. If the tape cartridge is not loaded, the robotic tape handling system is commanded to load the tape cartridge into an available unit which may be different than the tape unit specified by the host computer. A virtual path is formed between the host computer and the loaded tape unit. Data is then transferred between the loaded tape unit and the host computer. This presents the host computer with a virtual view of connection to the specified tape volume loaded in the specified tape unit.

In an embodiment of the present invention, the TLCU can receive at least one write command from the host computer to write data to desired volume. If the tape cartridge containing the desired volume is loaded into a tape unit for access to a tape volume other than the desired tape volume, the write command is staged and the data is written in a storage system. When the tape cartridge containing the desired volume is no longer accessing a tape volume other than the desired tape volume, the staged write command is executed and the data from the storage system is written onto the tape cartridge. Similarly, the TLCU can receive a read command from the host computer to read data from a desired volume. If the tape cartridge containing the desired volume is loaded into a tape unit for access to a tape volume other than the desired tape volume, the read command is staged. When the tape cartridge containing the desired volume is no longer accessing a tape volume other than the desired tape volume, the staged read command is executed.

In another embodiment of the present invention, the tape library system includes at least one user accessible tape unit that is not part of the automated tape system. The TLCU can transfer data between an external tape cartridge loaded in the user accessible tape unit and a specified tape volume contained on a tape cartridge within the automated tape system without involvement by the host computer. In a refinement, the user accessible tape unit accepts tape cartridges having a format different than the tape cartridges used in the automated tape system.

In yet another embodiment of the present invention, the TLCU retains a list of volumes contained on each tape cartridge. The TLCU determines when the tape in each tape cartridge requires defragmenting based on the list of volumes. When a tape unit is available, the determined tape cartridge is loaded into the available tape unit and the tape is defragmented.

In a further embodiment of the present invention, the TLCU maintains an indication of usage for each tape unit. Determining into which tape unit a tape cartridge will be loaded is based on the usage indication for each tape unit, thereby balancing wear of tape units.

In a still further embodiment of the present invention, the TLCU provides tape volume management services including tape volume password creation and modification, tape volume expiration date creation and modification, tape volume ownership creation and modification, tape volume import, and tape volume export.

A method of servicing requests to a tape library system is also provided. The method includes receiving a request from a host computer to access a specified tape volume. The specified tape volume is mapped to a tape cartridge. If the tape cartridge is not currently loaded in a tape unit, the robotic tape handling system is commanded to load the tape cartridge into an available tape unit. A virtual path is then formed between the host computer and the loaded tape unit. Data is then transferred between the loaded tape unit and the host computer through the TLCU.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 4 is a diagram illustrating information held by the tape/library control unit according to an embodiment of the present invention;

BEST MODE FOR CARRYING OUT THE INVENTION

Figure 1:
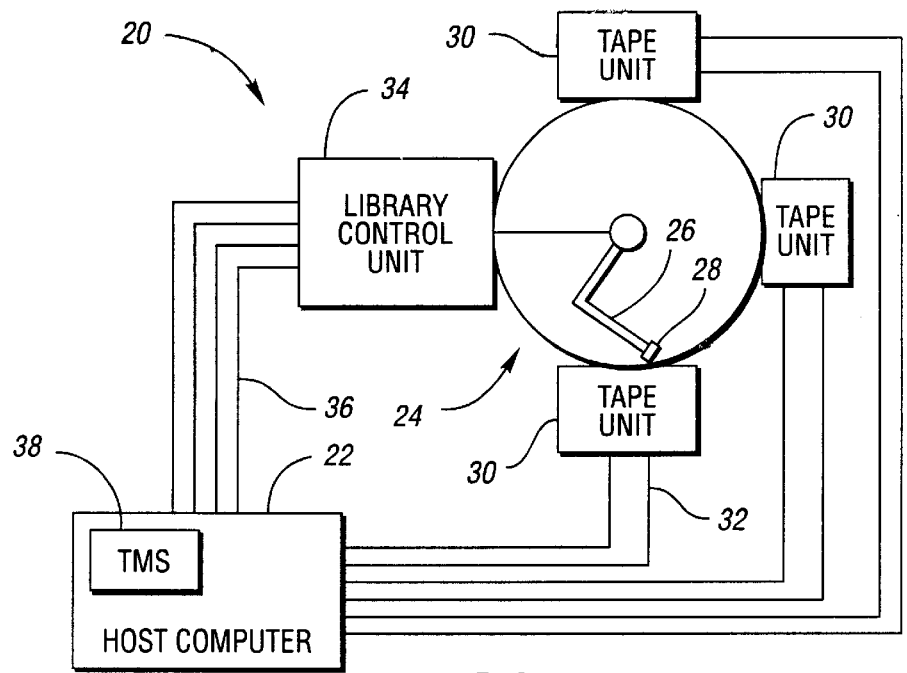
FIG. 1 is a block diagram of a prior tape library system.

Referring now to FIG. 1, a block diagram of a prior tape library system is shown. A tape library system, shown generally by 20, services at least one host computer 22. Tape library system 20 includes an automated tape system shown generally by 24. Automated tape system 24 uses robotic tape handling system 26 to move tape cartridges, one of which is shown by 28, between storage locations, not shown for clarity, and one or more tape units 30. Each tape unit 30 is operative to write data onto or read data from tape cartridge 28 loaded therein. Each tape unit 30 is connected to host computer 22 through one or more channels, one of which is shown by 32, used to carry data and control signals between tape unit 30 and host computer 22. Robotic tape handling system 26 is directed by library control unit (LCU) 34. LCU 34 receives commands from host computer 22 and returns status to host computer 22 through one or more command channels, one of which is indicated by 36.

Host computer 22 includes tape management system (TMS) 38, typically implemented in software. TMS 38 receives requests to access a tape volume, and determines tape cartridge 28 containing the requested tape volume. In prior art tape library system 20, each tape cartridge 28 contains only one volume. Once tape cartridge 28 is determined, the storage location containing cartridge 28 is determined. An available tape unit 30 is found and LCU 34 is commanded to load available tape unit 30 with the determined tape cartridge. TMS 38 then accesses loaded tape unit 30 through one or more channels 32.

One difficulty with prior art tape library system 20 is the computational overhead burden on host computer 22 by TMS 38. This burden can be decreased by moving TMS 38 functionality from host computer 22 to LCU 34. Another difficulty with prior art tape library system 20 is the storage inefficiency caused by permitting only one volume in each tape cartridge 28. Permitting multi-volume tape cartridges 28 increases storage efficiency but also requires increased functionality from TMS 38. A further difficulty with prior art tape library system 20 is the difficulty in transferring data between tape cartridge 28 within automated tape system 24 and another tape cartridge 28 external to automated tape system 24. Typically, an additional tape unit 30 must be connected directly to host computer 22 using at least one additional data channel 32. Additional logic in TMS 38 may also be required to handle data transfer operations.

Figure 2:
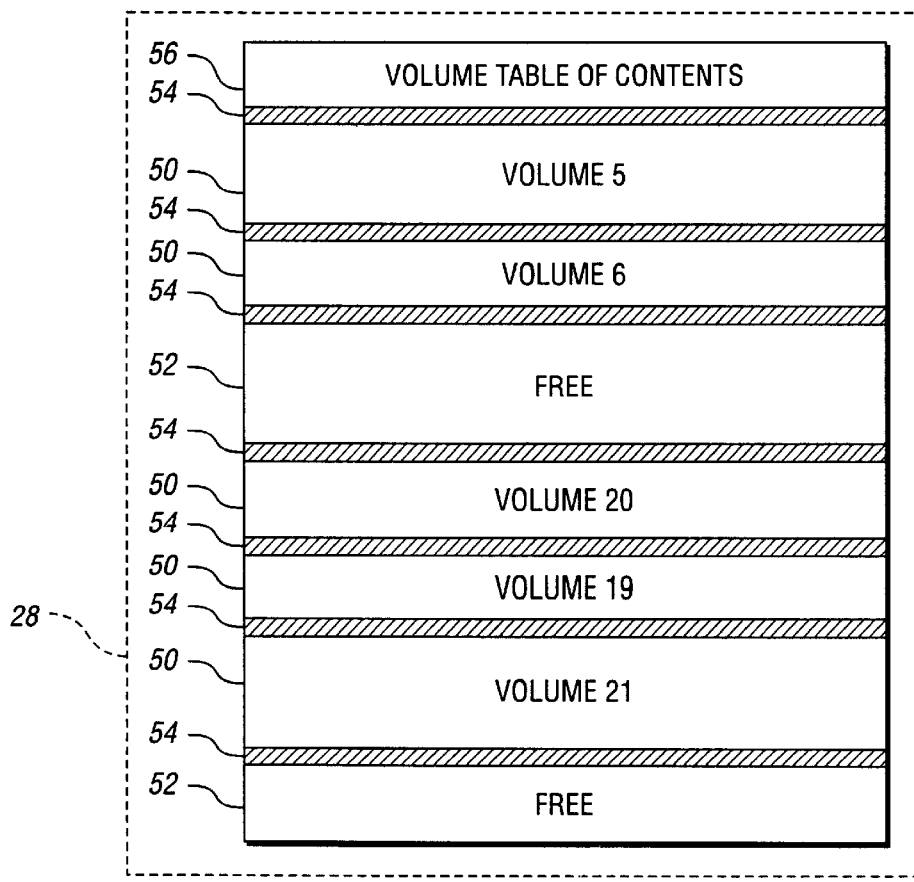
FIG. 2 is a conceptualized diagram of a multi-volume tape cartridge that may be used with the present invention.

Referring now to FIG. 2, a conceptualized diagram of a multi-volume tape cartridge that may be used with the present invention is shown. Tape cartridge 28 may contain one or more volumes 50. Portions of tape in tape cassette 28 may also be one or more free regions 52. Each volume 50 is separated from surrounding regions by volume marker 54. Each volume marker 54 may contain information about the following volume 50 such as volume length and volume fullness. Tape cassette 28 may also include Volume Table of Contents 56. Volume Table of Contents 56 may include the name of each volume 50 on tape cartridge 28, the starting location of each volume 50, the size of each volume 50, and the like.

Figure 3:
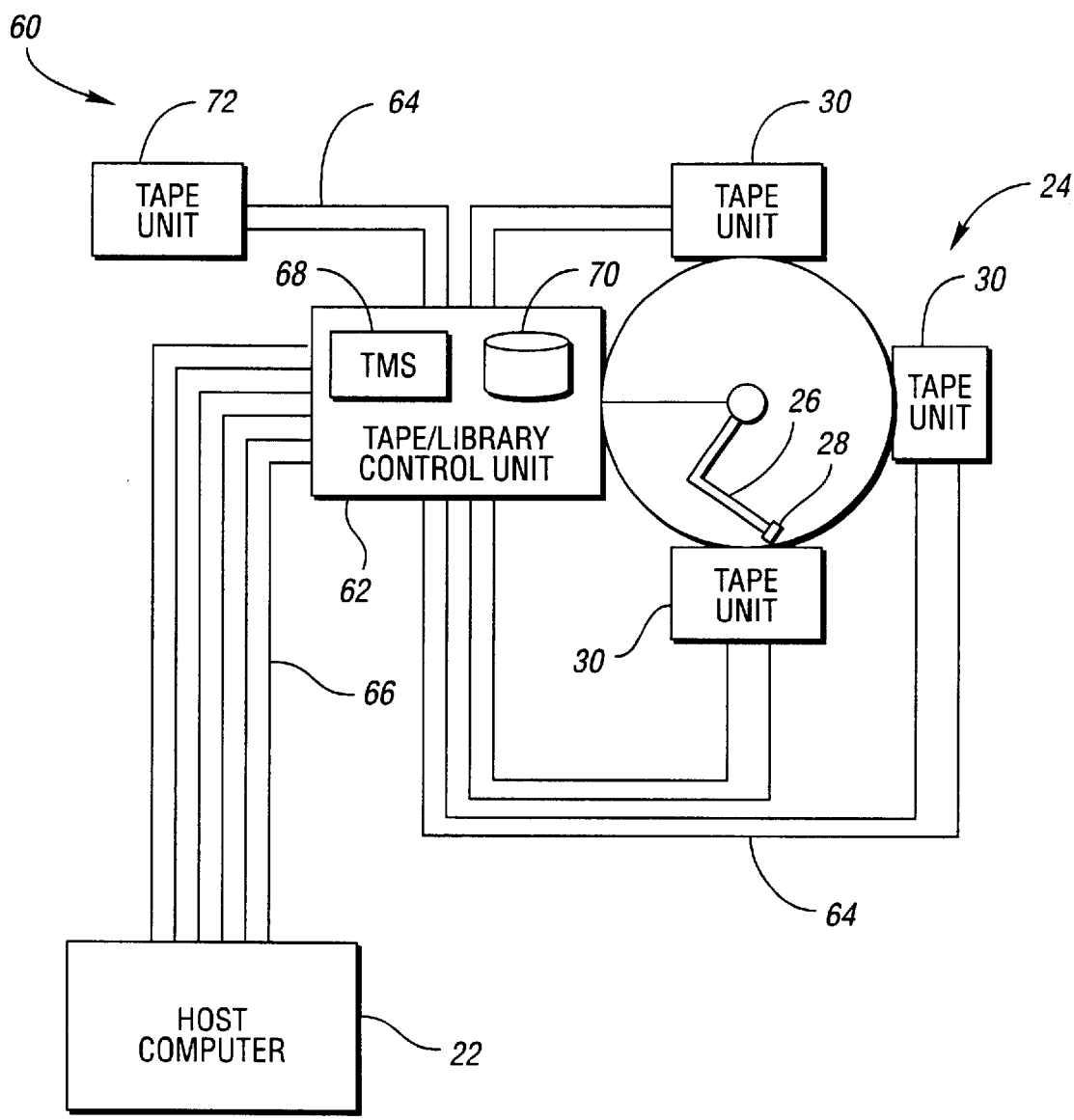
FIG. 3 is a block diagram of an embodiment of a tape library system according to the present invention.

Referring now to FIG. 3, a block diagram of an embodiment of a tape library system according to the present invention is shown. Tape library system 60 responds to a request from host computer 22 to access volume 50 on tape cartridge 28. Volume 50 may be accessed once cartridge 28 is loaded into tape unit 30 by robotic tape handling system 26 in automated tape system 24. Automated tape system 24 shown in FIG. 3 includes three tape units 30 and one robot in robotic tape handling system 26. However, the present invention may be used with automated tape system 24 having any number of tape units 30 and robotic tape handlers. Also, various forms of automation may be used to implement robotic tape handling system 26.

Robotic tape handling system 26 and each tape unit 30 operate under the control of TLCU 62. Each tape unit 30 is connected to TLCU 62 by at least one tape unit channel, one of which is shown by 64. Each host computer 22 is connected to TLCU 62 by at least one host channel, one of which is shown by 66. Each tape unit channel 64 and host channel 66 is a high speed data transfer channel such as FIPS, ESCON, SCSI, Fiber Channel, and the like.

TLCU 62 includes TMS 68 for managing tape library system 60. In one embodiment of the present invention, TMS 68 handles multi-volume tape cartridges 28 while presenting host computer 22 with a virtual view of tape library system 60 consisting of single volume tape cartridges 28 loaded into tape units 30 directly connected to host computer 22. In a virtual view, host computer 22 does not need to know the specific address of tape unit 30 to access tape volume 50 loaded into tape unit 30. The host may request access to tape volume 50 through the tape volume name. However, if the host requests a specific tape unit 30 by tape unit address, TLCU 62 selects an appropriate tape unit 30 available and maps the requested tape unit address to the actual address of tape unit 30 containing tape volume 50. A method for selecting an appropriate tape unit 30 is described with regards to FIG. 7 below. In order to accomplish virtual mapping, TLCU 62 first receives a request from host computer 22 to access specified tape volume 50 in specified tape unit 30. TLCU 62 maps specified tape volume 50 to tape cartridge 28 containing volume 50. TLCU 62 determines if tape cartridge 28 is currently loaded into any tape unit 30. If tape cartridge 28 is not loaded, robotic tape handling system 26 is commanded to load cartridge 28 into available tape unit 30. TLCU 62 forms a virtual path between host computer 22 and loaded tape unit 30 using at least one host channel 66 and at least one tape unit channel 64. Data may then be transferred between loaded tape unit 30 and host computer 22.

In an embodiment of the present invention, tape library system 60 includes storage system 70 operative to permit rapid storage and retrieval of data. Storage system 70 may be implemented using any fast, non-volatile storage means such as magnetic disks, bubble memory, battery-backed volatile read/write memory, electrically erasable programmable read only memory, optical devices, and the like. If TLCU 62 receives a request from host computer 22 to access volume 50 on tape cartridge 28 and TLCU 62 determines that tape cartridge 28 is loaded into a tape unit 30 for access to a tape volume 50 other than the desired tape volume 50, the request is staged in storage system 70. If this request is a write command, the data to be written into volume 50 is also staged in storage system 70. TLCU 62 determines when tape cartridge 28 containing desired volume 50 is not accessing a tape volume 50 other than the desired tape volume 50. TLCU 62 then executes the staged requests, including writing data into volume 50 if the request is a write command.

In another embodiment of the present invention, tape library system 60 includes user accessible tape unit 72 which is not part of automated tape system 24. Tape unit 72 is connected to TLCU 62 through at least one tape unit channel 64. TLCU 62 can transfer data between an external tape cartridge 28 loaded in tape unit 72 and at least one specified tape volume 50 on cartridge 28 within automated tape system 24 without involvement by host computer 22. Tape cartridge 28 in tape unit 72 and tape cartridge 28 in tape unit 30 may have a different format. The differing format may include cartridge type, tape size, tape capacity, data storage format, and the like.

In a preferred embodiment of the present invention, TLCU 62 validates data transferred between host computer 22 and tape unit 30 or between tape units 30,72. This validation may include error correction and detection. This validation may also include access restriction such as volume passwords and volume group ownership. To support data validation and other volume management services, TLCU 62 provides tape volume password creation and modification, tape volume expiration date creation and modification, tape volume ownership creation and modification, tape volume import, and tape volume export.

As multi-volume tape cartridge 28 continues to be used, the addition and deletion of volumes 50 may create multiple free regions 52 each too small to effectively hold volume 50. When this occurs, tape in tape cartridge 28 requires defragmenting. TLCU 62 retains a list of volumes 50 contained on each tape cartridge 28 and determines when tape cartridge 28 requires defragmenting based on the list of volumes. When tape unit 30 is idle, tape cartridge 28 requiring defragmenting is loaded into tape unit 30 and the tape in cartridge 28 is defragmented.

One method for defragmenting is to find a second cartridge 28 containing enough free regions 52 to hold all volumes 50 on cartridge 28 requiring defragmenting. The second cartridge 28 is loaded into a second available tape unit 30. Each volume 50 is then read from tape cartridge 28 requiring defragmenting by TLCU 62 and written onto second tape cartridge 28. Another method for defragmenting is to write data contained in tape cartridge 28 into a memory, such as storage system 70, then write the data back to tape cartridge 28 in a manner allowing for the collection of free space into one contiguous region.

If automated tape system 24 contains more than one tape unit 30, TLCU can balance tape unit usage in another embodiment of the present invention. TLCU 62 maintains an indication of usage for each tape unit. If more than one tape unit 30 is available, tape cartridge 28 is loaded into tape unit 30 based on the usage indication. A method for determining into which tape unit 30 cartridge 28 should be loaded is described with regards to FIG. 7 below.

Referring now to FIG. 4, a diagram illustrating information held by the tape/library control unit according to an embodiment of the present invention is shown. The information is shown in a tabular format for ease of illustration. TLCU 62 includes tape unit availability table 80 describing tape units 30. Each tape unit 30 has a tape unit identifier and a logical tape unit address. The description for each tape unit 30 also includes a list of the types of cartridge 28 which can be accessed by tape unit 30. An in-use indicator indicates if a cartridge 28 is currently loaded into tape unit 30. A problem indicator indicates if tape unit 30 should not be loaded due to a previously detected difficulty. The last time used indicates the time and date when a cartridge 28 was last loaded into tape unit 30. Frequency of use indicates the usage of tape unit 30. Frequency of use may be, for example, the total number of cartridges 28 loaded into tape unit 30.

TLCU 62 also includes volume information expressed as volume information table 82. Each volume 50 has a logical name, VOLSER. Each volume 50 has a cartridge identifier indicating tape cartridge 28 which contains volume 50. An owner may be assigned to each volume 50 and that owner may assign a password. Each volume 50 may also be assigned to a group. Access permissions may be based on owner, group, and world settings. Each volume 50 may also include an expiration date beyond which volume 50 is considered invalid.

TLCU 62 further includes cartridge information expressed as cartridge information table 84. Each tape cartridge 28 has a unique cartridge identifier and a cartridge type. Cartridge location indicates where cartridge 28 is stored within automated tape system 24. An in-use indicator is asserted when cartridge 28 is loaded into tape unit 30. A fragment indicator is asserted when tape in cartridge 28 requires defragmenting. Additional information may include total used space, total free space, and total defect space on tape in cartridge 28. Defect space on cartridge 28 may be used by TLCU 62 to determine when cartridge 28 should be replaced.

Unit/cartridge/volume table 86 indicates, for each loaded volume 50, the cartridge identifier for cartridge 28 containing volume 50, and the tape unit identifier of tape unit 30 containing cartridge 28.

Figure 5:
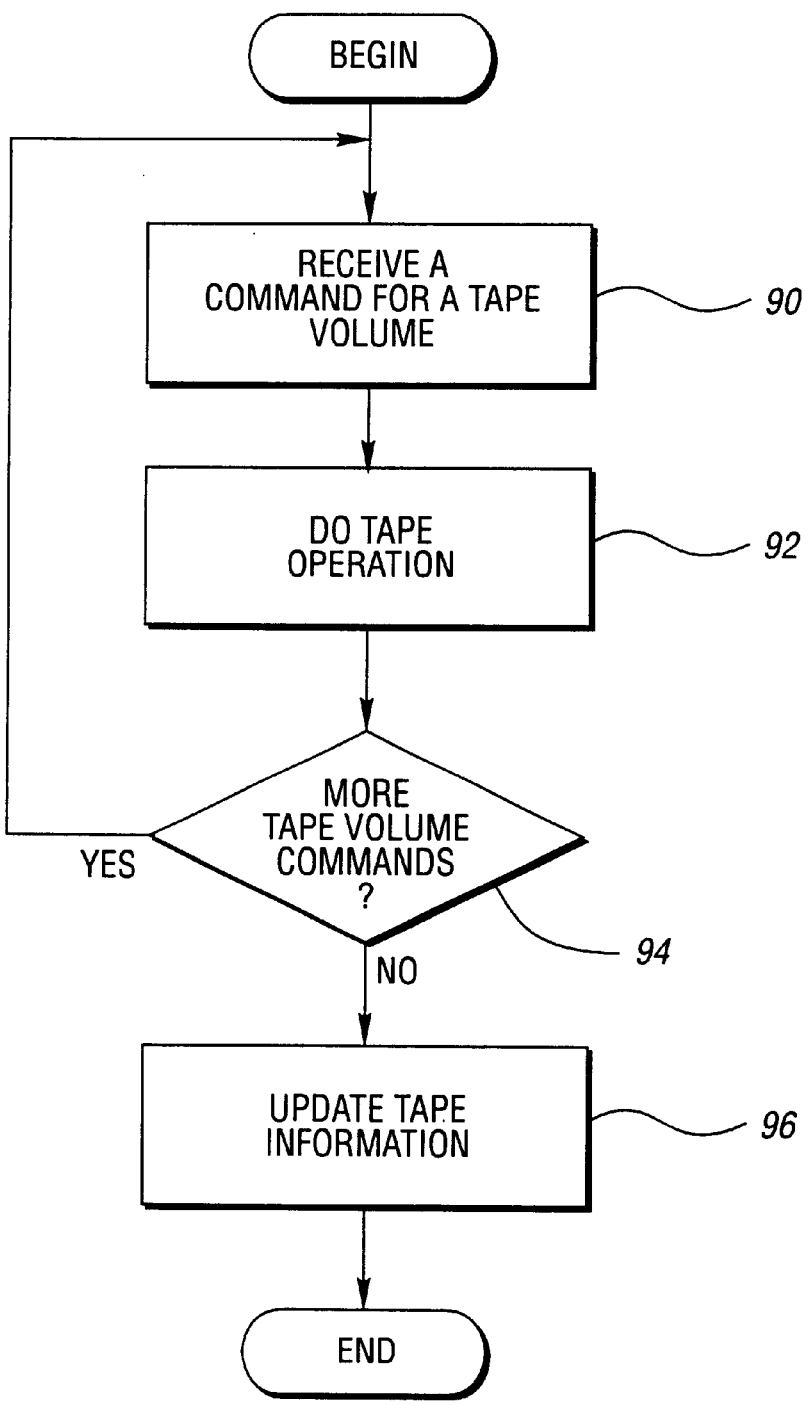
FIG. 5 is a flow diagram illustrating tape command processing according to an embodiment of the present invention.
Figure 6:
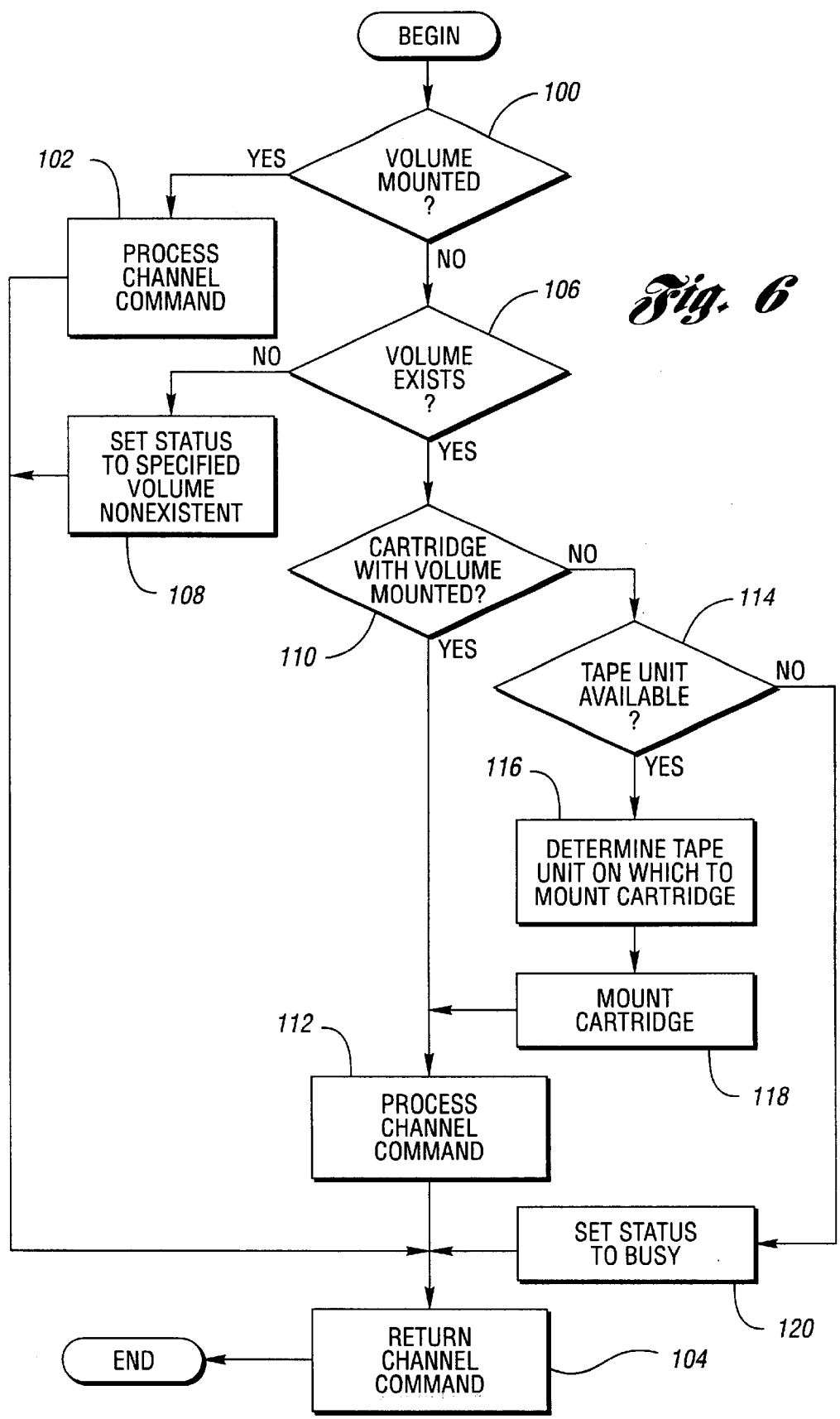
FIG. 6 is a flow diagram illustrating a tape operation according to an embodiment of the present invention.
Figure 7:
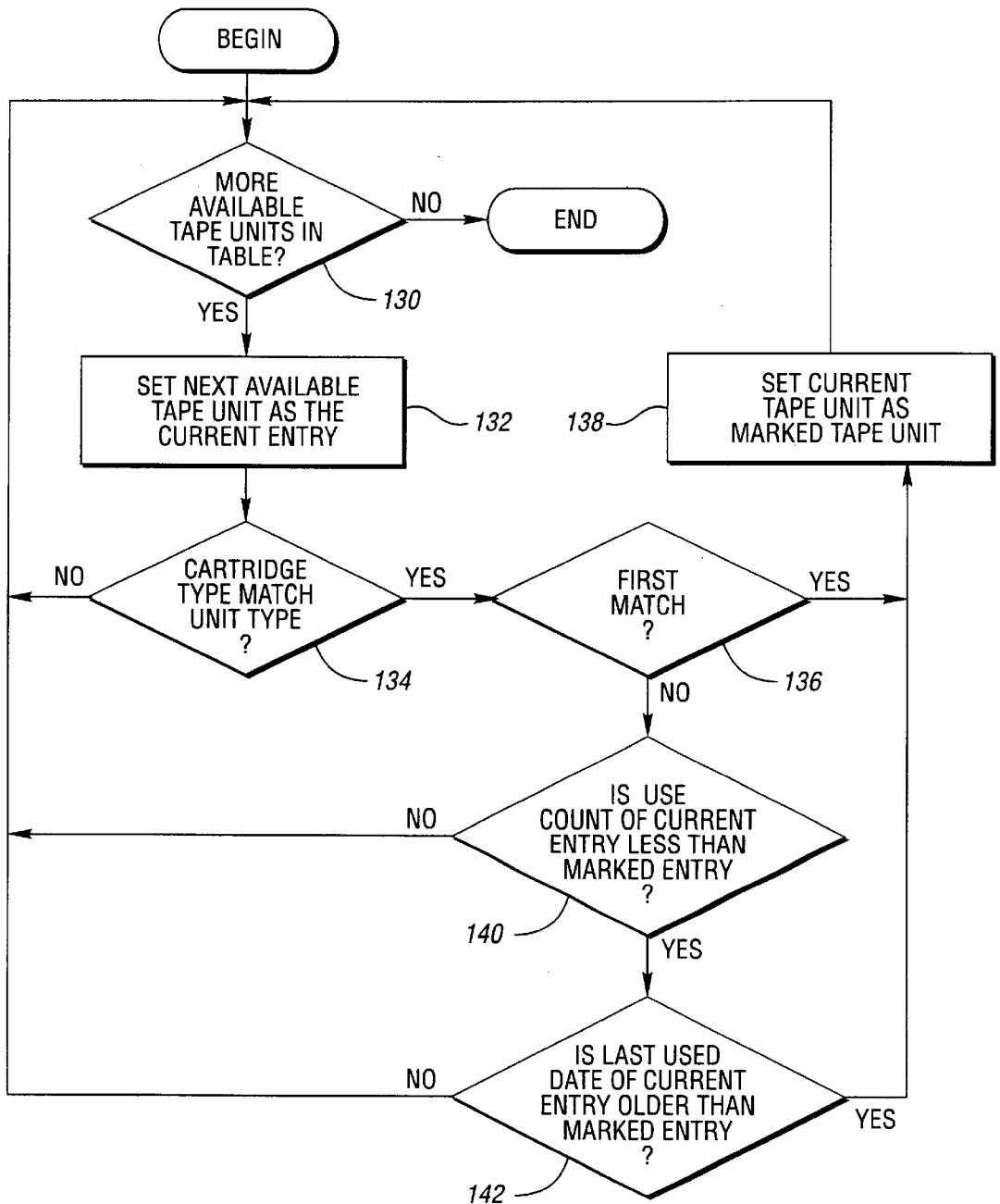
FIG. 7 is a flow diagram illustrating tape unit selection according to an embodiment of the present invention.

FIGS. 5, 6, and 7 show flow diagrams illustrating an operation of embodiments of the present invention. As will be appreciated by one of ordinary skill in the art, the operations illustrated are not necessarily sequential operations. Similarly, operations may be performed by software, hardware, or a combination of both. The present invention transcends any particular implementation and aspects are shown in sequential flow chart form for ease of illustration.

Referring now to FIG. 5, a flow diagram illustrating tape command processing according to an embodiment of the present invention is shown. A command for a tape volume is received in block 90. Host 22 may issue a sequence of commands for volume 50. Such a sequence may include a mount command followed by multiple read and write commands then a dismount command. Once a command is received, the tape operation is performed in block 92. A description of a typical tape operation is described with regards to FIG. 6 below. Once the tape operation is completed, a check is made to determine if more tape commands will follow in block 94. If TLCU 62 anticipates additional commands directed to tape volume 50, TLCU 62 waits to receive a command as in block 90. If no more commands are anticipated for tape volume 50, tape information is updated in block 96. Cartridge information table 84 is updated to indicate new values for total use space, total free space, and total defect space. If cartridge 28 does not include an additional volume 50 attempting to be accessed, cartridge 28 is placed into storage. The storage location is noted and the in-use indicator is deasserted. TLCU 62 uses cartridge information table 84 and Volume Table of Contents 56 on cartridge 28 to determine if defragmenting is required and, if so, the fragment indicator for cartridge 28 is asserted. Unit/cartridge/volume table 86 is updated by removing the entry for volume 50. If the media information from tape unit 30 is valid, volume information table 82 is updated.

Referring now to FIG. 6, a flow diagram illustrating a tape operation according to an embodiment of the present invention is shown. A check is made to determine if the volume is mounted in block 100. Unit/cartridge/volume table 86 is searched for the requested logical volume (VOLSER). If volume 50 is found in table 86, tape cartridge 28 containing volume 50 is currently mounted in tape unit 30. If volume 50 is mounted, the command is processed in block 102 and the command status is returned in block 104. If volume 50 does not have an entry in table 86, the location of cartridge 28 containing volume 50 must be determined.

A check is made to determine if the volume exists in block 106. Volume information table 82 is searched for the VOLSER of requested volume 50. If the VOLSER is not in table 82, status is set to specify the requested volume as non-existent in block 108 and the command status returned in block 104. If the VOLSER is found in table 82, the cartridge identifier for cartridge 28 containing requested volume 50 is obtained.

A check is made to determine if the cartridge with the requested volume is mounted in block 110. Cartridge information table 84 is searched for the cartridge identifier for cartridge 28 containing requested volume 50. Once found in table 84, the in-use indicator is examined to determine if cartridge 28 is loaded into tape unit 30. If so, the command is processed in block 112 and command status returned in block 104. If cartridge 28 is not loaded in tape unit 30, a check is made to determine if any tape units are available in block 114. If at least one tape unit 30 does not contain a tape cartridge 28, a determination is made as to the tape unit on which to mount the cartridge in block 116. A method for determining on which tape unit 30 tape cartridge 28 should be mounted is described with regards to FIG. 7 below. The cartridge is then mounted in block 118, the command processed in block 112 and command status return in block 104. If no tape unit 30 is available, command status is set to busy in block 120 and the command status returned in block 104. In one embodiment, the command is stored in memory, such as storage system 70, until an appropriate tape unit 30 becomes available.

Referring now to FIG. 7, a flow diagram illustrating tape unit selection according to an embodiment of the present invention is shown. A check is made to determine if more available tape units remain in the tape unit availability table in block 130. Unit availability table 80 is searched from the beginning by examining the in-use indicator for each entry. When no more entries exist with the in-use indicator unasserted, the method ends. If an entry corresponding to tape unit 30 indicates that tape unit 30 is not in use, the next available tape unit entry is set as the current entry in block 132. A check is made in block 134 to determine if the cartridge type of the current entry includes the cartridge type of cartridge 28 containing requested volume 50. If not, the method returns to block 130.

If the current entry cartridge type includes the cartridge type of cartridge 28, a check is made to determine if this is the first match of the search in block 136. If so, the current tape unit is set as the marked tape unit in block 138. The marked tape unit will be loaded with cartridge 28 at the end of the method. If the match is not the first match, a check is made to determine if the use count of the current entry is greater than the use count of the marked entry in block 140. The frequency of use field for the marked tape unit is compared to the frequency of use field for the current entry tape unit. If current entry tape unit 30 has not been used less than marked entry tape unit 30, the check for more available tape units is made in block 130. If current entry tape unit 30 has been used less than marked entry tape unit 30, a check is made to determine if the last used date of the current entry is older than the last used date of the marked entry in block 142. If not, the check for more available tape units is made in block 130. If the last used date of the current entry is older than the last used date of the marked entry, the current tape unit is set as the marked tape unit in block 138. The check for more available tape units is repeated in block 130. This assists in evening the wear between tape units 30.

While embodiments of the invention have been illustrated and described, it is not intended that these embodiments illustrate and describe all possible forms of the invention. Rather, it is intended that the following claims cover all modifications and alternative designs, and all equivalence, that fall within the spirit and scope of this invention.

What is claimed is:

1. A tape library system for handling multi-volume tape cartridges, each tape cartridge comprising at least one tape volume, the tape library system servicing requests from at least one host computer, the system comprising:

at least one tape unit operable to write data to and read data from a tape cartridge, each of the at least one tape unit part of an automated tape system;

a robotic tape handling system operable to load tape cartridges into and remove tape cartridges from each of the at least one tape unit in the automated tape system; and a tape/library control unit (TLCU) in communication with each of the at least one host computer, each of the at least one tape unit, and the robotic tape handling system, the tape library control unit operative to
a) receive a request from a host computer to access a specified tape volume in a specified tape unit,
b) map the specified tape volume to a tape cartridge,
c) determine if the tape cartridge is currently loaded in one of the at least one tape unit and, if the tape cartridge is not loaded, command the robotic tape handling system to load the tape cartridge into an available tape unit, a loaded tape unit thereby holding the tape cartridge,
d) form a virtual path between the host computer and the loaded tape unit, and
e) transfer data between the loaded tape unit and the host computer;
thereby presenting the host computer with a virtual view of connection to the specified tape volume loaded in the specified tape unit.

2. A tape library system as in claim 1 wherein the TLCU comprises a storage system operative to permit rapid storage and retrieval of data, the TLCU further operable to:
receive at least one write command from one of the at least one host computer to write data to a desired tape volume;
determine that the tape cartridge containing the desired tape volume is loaded into a tape unit for access to a tape volume other than the desired tape volume;
if the tape cartridge containing the desired tape volume is loaded into a tape unit for access to a tape volume other than the desired tape volume, stage the at least one write command and data to be written in the storage system;
determine when the tape cartridge containing the desired volume is not in use;
when the tape cartridge containing the desired volume is not in use, execute the at least one staged write command and write the data from the storage system to the tape cartridge containing the desired volume.

3. A tape library system as in claim 1 wherein the TLCU comprises a storage system operative to permit rapid storage and retrieval of data, the TLCU is further operable to:
receive at least one read command from one of the at least one host computer to read data from a desired volume;
determine that the tape cartridge containing the desired tape volume is loaded into a tape unit for access to a tape volume other than the desired tape volume;
if the tape cartridge containing the desired tape volume is loaded into a tape unit for access to a tape volume other than the desired tape volume, stage the at least one read command;
determine when the tape cartridge containing the desired volume is not in use;
when the tape cartridge containing the desired volume is not in use, execute the at least one staged read command.

4. A tape library system as in claim 1 wherein the TLCU is further operable to verify that data transferred between the loaded tape unit and the host computer is valid.

5. A tape library system as in claim 1 further comprising at least one user accessible tape unit that is not part of the automated tape system, the user accessible tape unit in communication with the TLCU, the TLCU further operable to transfer data between an external tape cartridge loaded in the user accessible tape unit and at least one specified tape volume, thereby allowing a user to copy at least one specified volume.

6. A tape library system as in claim 5 wherein the at least one user accessible tape unit accepts tape cartridges having a format different than tape cartridges used in the automated tape system.

7. A tape library system as in claim 5, the TLCU further operable to perform error detection and correction on data transferred between the external tape cartridge loaded in the user accessible tape unit and the at least one specified volume.

8. A tape library system as in claim 1, the TLCU further operable to:
retain a list of volumes contained on each tape cartridge;
determine a tape cartridge containing tape which requires defragmenting based on the list of volumes;
determine when at least one tape unit is available for defragmenting;
when the at least one tape unit is available, load the determined tape cartridge into one determined available tape unit; and
defragment the tape in the determined tape cartridge.

9. A tape library system as in claim 1 wherein the at least one tape unit is a plurality of tape units, the TLCU further operable to:
maintain an indication of usage for each tape unit; and
determine into which tape unit to load a tape cartridge based on the usage indication for each tape unit;
thereby balancing wear of the at least one tape unit.

10. A tape library system as in claim 1 wherein the TLCU is further operable to provide tape volume management services comprising:
tape volume password creation;
tape volume password modification;
tape volume expiration date creation;
tape volume expiration date modification;
tape volume ownership creation;
tape volume ownership modification;
tape volume import; and
tape volume export.

11. A tape library system as in claim 1 wherein a first channel is used to carry communication signals between the TLCU and at least one host computer and wherein a second channel is used to carry communication signals between the TLCU and at least one tape unit, the first channel having a different channel type than the second channel.

12. In a tape library system for handling multivolume tape cartridges, each tape cartridge comprising at least one tape volume, wherein the tape library system comprises at least one tape unit operable to write data to and read data from a tape cartridge, each of the at least one tape unit part of an automated tape system, a robotic tape handling system operable to load tape cartridges into and remove tape cartridges from each of the at least one tape unit in the automated tape system, and a tape/library control unit (TLCU) in communication with each of the at least one host computer, each of the at least one tape unit, and the robotic tape handling system, a method for servicing requests comprising:
receiving a request from a host computer to access a specified tape volume in a specified tape unit;
mapping the specified tape volume to a tape cartridge;
determining if the tape cartridge is currently loaded in one of the at least one tape unit;

if the tape cartridge is not loaded, commanding the robotic tape handling system to load the tape cartridge into an available tape unit, a loaded tape unit thereby holding the tape cartridge;

forming a virtual path between the host computer and the loaded tape unit; and transferring data between the loaded tape unit and the host computer through the TLCU.

13. The method of claim 12 wherein the TLCU comprises a storage system operative to permit rapid storage and retrieval of data, the method further comprising:

receiving at least one write command from one of the at least one host computer to write data to a desired volume;

determining that the tape cartridge containing the desired tape volume is loaded into a tape unit for access to a tape volume other than the desired tape volume;

if the tape cartridge containing the desired tape volume is loaded into a tape unit for access to a tape volume other than the desired tape volume, staging the at least one write command and data to be written in the storage system;

determining when the tape cartridge containing the desired volume is not in use;

when the tape cartridge containing the desired volume is not determined to be accessing a tape volume other than the desired tape volume, executing the at least one staged write command and writing the data from the storage system to the tape cartridge containing the desired volume.

14. The method of claim 12 wherein the TLCU comprises a storage system operative to permit rapid storage and retrieval of data, the method further comprising:

receiving at least one read command from one of the at least one host computer to read data from a desired volume;

determining that the tape cartridge containing the desired tape volume is loaded into a tape unit for access to a tape volume other than the desired tape volume;

if the tape cartridge containing the desired tape volume is loaded into a tape unit for access to a tape volume other than the desired tape volume, staging the at least one read command;

determining when the tape cartridge containing the desired volume is not in use;

when the tape cartridge containing the desired volume is not determined to be accessing a tape volume other than the desired tape volume, executing the at least one read command.

15. The method of claim 12 further comprising verifying that data transferred between the loaded tape unit and the host computer is valid.

16. The method of claim 12 wherein the tape library system further comprises at least one user accessible tape unit that is not part of the automated tape system, the user accessible tape unit in communication with the TLCU, the method further comprising transferring data between an external tape cartridge loaded in the user accessible tape unit and at least one specified tape volume, thereby allowing a user to copy at least one specified volume.

17. The method of claim 16 wherein the at least one user accessible tape unit accepts tape cartridges having a format different than tape cartridges used in the automated tape system.

18. The method of claim 16 further comprising performing error detection and correction on data transferred between the external tape cartridge loaded in the user accessible tape unit and the at least one specified volume.

19. The method of claim 12 further comprising retaining a list of volumes contained on each tape cartridge;

determining when a tape cartridge contains tape which requires defragmenting based on the list of volumes;

determining when at least one tape unit is available for defragmenting;

when the at least one tape unit is available, loading the determined tape cartridge into one determined available tape unit; and defragmenting the tape in the determined tape cartridge.

20. The method of claim 12 further comprising:

maintaining an indication of usage for each tape unit; and determining into which tape unit a tape cartridge will be loaded based on the usage indication for each tape unit.

21. The method of claim 12 further comprising:

communicating with at least one host computer over a first channel; and communicating with at least one tape unit over a second channel having a different channel type than the first channel.

* * * * *